United States Patent
Liu et al.

(10) Patent No.: US 12,517,114 B2
(45) Date of Patent: Jan. 6, 2026

(54) PRIMARY GASTROINTESTINAL STROMAL TUMOR CELL CULTURE MEDIUM, CULTURE METHOD AND APPLICATION THEREOF

(71) Applicant: PRECEDO PHARMACEUTICALS CO., LTD, Anhui (CN)

(72) Inventors: Qingsong Liu, Anhui (CN); Feiyang Liu, Anhui (CN); Xiaoyu Li, Anhui (CN); Husheng Mei, Anhui (CN); Wenchao Wang, Anhui (CN); Tao Ren, Anhui (CN); Li Wang, Anhui (CN)

(73) Assignee: PRECEDO PHARMACEUTICALS CO., LTD, Anhui (CN)

( * ) Notice: Subject to any disclaimer, the term of this patent is extended or adjusted under 35 U.S.C. 154(b) by 363 days.

(21) Appl. No.: 18/271,773

(22) PCT Filed: Jan. 22, 2021

(86) PCT No.: PCT/CN2021/073246
§ 371 (c)(1),
(2) Date: Jul. 11, 2023

(87) PCT Pub. No.: WO2022/151520
PCT Pub. Date: Jul. 21, 2022

(65) Prior Publication Data
US 2024/0319169 A1    Sep. 26, 2024

(30) Foreign Application Priority Data
Jan. 13, 2021  (CN) .......................... 202110041939.2

(51) Int. Cl.
*G01N 33/50* (2006.01)
*C12N 5/09* (2010.01)

(52) U.S. Cl.
CPC ....... *G01N 33/5011* (2013.01); *C12N 5/0693* (2013.01); *C12N 2501/115* (2013.01); *C12N 2501/119* (2013.01); *C12N 2501/125* (2013.01); *C12N 2501/135* (2013.01); *C12N 2501/345* (2013.01); *C12N 2533/54* (2013.01)

(58) Field of Classification Search
None
See application file for complete search history.

(56) References Cited

U.S. PATENT DOCUMENTS

2017/0191030 A1    7/2017  Huch Ortega et al.

FOREIGN PATENT DOCUMENTS

| CN | 103333858 A | 10/2013 |
|----|-------------|---------|
| CN | 106834212 A | 6/2017 |
| CN | 106967672 A | 7/2017 |

OTHER PUBLICATIONS

Fukuda K. et al., "Establishment and Characterization of Novel Cell Lines and Xenografts from Patients With Gastrointestinal Stromal Tumors", Oncology Reports 30:71-78 (2013).
Liu F. et al., "Axitinib Overcomes Multiple Imatinib Resistant cKIT Mutations Including the Gatekeeper Mutation T6701 in Gastrointestinal Stromal Tumors", Therapeutic Advances in Medical Oncology 11:1-15 (2019).
Liu X. et al., "Conditional Reprogramming and Long-Term Expansion of Normal and Tumor Cells from Human Biospecimens", Nat Protoc. 12(2):439-451 (Feb. 2017).
Palechor-Ceron N. et al., "Radiation Induces Diffusible Feeder Cell Factor(s) That Cooperate With ROCK Inhibitor to Conditionally Reprogram and Immortalize Epithelial Cells", The American Journal of Pathology 183 (6):1862-1870 (Dec. 2013).
Sachs N. et al., "A Living Biobank of Breast Cancer Organoids Captures Disease Heterogeneity", Cell 172:373-386 (Jan. 11, 2018).
Xu H. et al., "Organoid Technology and Applications in Cancer Research", Journal of Hematology & Oncology 11:116 (2018).
Zhu B. et al., "Characteristics and Establishment of Cell Lines from Human Gastrointestinal Stromal Tumors", J Cent South Unv (Med Sci) 35(11):1138-1144 (2010).
International Search Report dated Oct. 20, 2021 issued in PCT/CN2021/073246.
Zhou, Fangying et al., "Establishment of GIST Cell Line and Its Sensitivity to C-KIT Downstream Inhibitors", Chinese Journal of Cancer Prevention and Treatment (Jun. 30, 2019), vol. 26, No. 11, pp. 764-777, with English Abstract.
International Preliminary Report on Patentability dated Jul. 13, 2023 received in International Application No. PCT/CN2021/073246.
Bai C-G et al., "Stem Cell Factor-Mediated Wild-Type KIT Receptor Activation is Critical for Gastrointestinal Stromal Tumor Cell Growth", World Journal of Gastroenterology 18(23):2929-2937 (Jun. 21, 2012) (cited in JP Notice of Reasons for Refusal).
Japanese Notice of Reasons for Refusal dated Sep. 3, 2024 received in Japanese Application No. 2023-542538, together with an English-language translation.

*Primary Examiner* — Robert A Wax
(74) *Attorney, Agent, or Firm* — Scully, Scott, Murphy & Presser, P.C.

(57) ABSTRACT

The present invention provides a cell culture medium for culturing primary gastrointestinal stromal tumor cells, comprising gastrin, N2, insulin, a receptor tyrosine kinase ligand, and a Rock kinase inhibitor. The present invention further provides a method for culturing gastrointestinal stromal tumor cells by using the cell culture medium, and an application and a method of an expanded cell population, which is obtained by using the method, in efficacy evaluation or screening.

15 Claims, 7 Drawing Sheets

PRIMARY GASTROINTESTINAL STROMAL TUMOR CELL CULTURE MEDIUM, CULTURE METHOD AND APPLICATION THEREOF

TECHNICAL FIELD

The invention relates to the technical field of medicine, in particular to a culture medium and a culture method for culturing or expanding gastrointestinal stromal tumor cells in vitro, and also to a method and a use of the cultured cells in efficacy evaluating and screening of drugs.

BACKGROUND OF THE INVENTION

Gastrointestinal stromal tumor (GIST) is a type of tumor originating from the mesenchymal tissue of the gastrointestinal tract, accounting for the majority of gastrointestinal mesenchymal tumors, mostly occurring in the stomach (50-70%). Due to its insensitivity to conventional radiotherapy, surgical resection is an effective method for treating GISTs. However, for patients who have lost the opportunity for surgery due to tumor progression, metastasis, or postoperative recurrence, the median survival time of GISTs is only 6-18 months, and the 5-year survival rate is less than 10%. Over the past decade, with the widespread application of molecular biology technology in the clinical diagnosis and treatment of GISTs, especially the emergence and popularization of molecular targeted drugs exemplified by imatinib, the prognosis of GIST patients has been significantly improved. At present, the significant curative effect of imatinib in the treatment of advanced GISTs and GIST postoperative adjuvant therapy has been widely recognized, but at the same time, the primary and secondary drug resistance of imatinib is also increasingly concerned by researchers. Studies have found that 40%-50% of patients develop drug resistance within 2 years after receiving imatinib treatment, and patients with imatinib resistance who received sunitinib as a second-line treatment drug have a median progression-free survival extension of only 6.8 months, while those who received regorafenib as a third-line treatment drug have a median progression-free survival extension of only 4.8 months. Therefore, it is urgently required to conduct further research on the pathogenesis of gastrointestinal stromal tumors in clinical practice and develop new drugs for treating gastrointestinal stromal tumors.

However, there is currently a lack of suitable research models for gastrointestinal stromal tumors. This is mainly due to the difference between gastrointestinal stromal tumors and other common tumors. Common tumors, such as lung cancer and breast cancer, are of epithelial origin. At present, the methods for culturing tumor cells from epithelium in vitro have developed relatively quickly, while the methods for culturing tumor cells from non-epithelial tissues in vitro are rarely reported (Xu et al., *Journal of Hematology & Oncology*, 11: 116, 2018). Moreover, the number of established models of gastrointestinal stromal tumor cell lines is also very limited, and only a handful of gastrointestinal stromal tumor cell lines are commercial available from international commercial cell companies, which poses many obstacles to the basic research and new drug development of gastrointestinal stromal tumors.

A technology using fresh tumor samples from patients with gastrointestinal stromal tumors to develop in vitro culture of primary gastrointestinal stromal tumor cells is a good means of developing research models for gastrointestinal stromal tumors. However, there is currently no recognized effective method for in vitro culturing the patient derived primary gastrointestinal stromal tumor cells. Serum is added to the culture medium in most of the reported methods (Liu et al., *Am J Pathol*, 183(6): 1862-1870, 2013; Liu et al., *Ther Adv Med Oncol*, 11: 1-15, 2019; Fukuda, *Oncology Reports*, 30: 71-78, 2013; Zhu et al., *Journal of Central South University*, 35(11): 1138-1144, 2010), which generally have issues with low success rates in culture and interference from non-gastrointestinal stromal tumor cells such as fibroblasts.

Therefore, it is urgently required to develop an effective method for in vitro culturing patient derived primary gastrointestinal stromal tumor cells, to meet the needs of basic research and new drug development in the field of gastrointestinal stromal tumors.

SUMMARY OF THE INVENTION

The invention aims to provide a cell culture medium for culturing primary gastrointestinal stromal tumor cells and a culture method for culturing primary gastrointestinal stromal tumor cells using the medium. The cell culture medium and the culture method of the invention can achieve the goal of high success rate, convenient operation, and no interference from non-gastrointestinal stromal tumor cells such as fibroblasts. When applying the cell culture medium and the culture method of the invention to construct primary gastrointestinal stromal tumor cell models, the gastrointestinal stromal tumor cells with the own biological characteristics of the gastrointestinal stromal tumor patients themselves can be obtained, which can be used to efficacy evaluating or screening of drugs.

One aspect of the invention is to provide a cell culture medium for culturing primary gastrointestinal stromal tumor cells, which comprises gastrin, N2, insulin, a receptor tyrosine kinase ligand and a Rock kinase inhibitor. The content of gastrin is preferably 0.3 nM-10 nM, more preferably 0.3 nM-3 nM, and further preferably 0.3 nM-1 nM.

The volume concentration of N2 in the cell culture medium ranges from 1:25 to 1:200; preferably, the volume concentration of N2 ranges from 1:50 to 1:100.

The content of insulin is 2 µg/ml-20 µg/ml, preferably 5 µg/ml-10 µg/ml. For example, commercially insulin solution (10 mg/mL, manufactured by Sigma) is added to the culture medium at a dilution ratio of 1:500-1:5000, preferably at a dilution ratio of 1:1000-1:2000; alternatively, commercially insulin-containing culture additive, Insulin-transferrin-selenium-ethanolamine (containing 1 mg/ml of insulin, manufactured by Gibco), is added to the culture medium at a dilution ratio of 1:50-1:500, preferably at a dilution ratio of 1:100-1:200.

The receptor tyrosine kinase ligand is at least one selected from the group consisting of platelet-derived growth factor AA, platelet-derived growth factor BB, platelet-derived growth factor CC, stem cell factor, insulin growth factor 1, basic fibroblast growth factor, and fibroblast growth factor 10; preferably, the receptor tyrosine kinase ligand is one or more selected from the group consisting of platelet-derived growth factor AA, stem cell factor, and basic fibroblast growth factor. When one or more receptor tyrosine kinase ligands are contained, the content of each receptor tyrosine kinase ligand is 5 ng/ml-500 ng/ml, preferably 20 ng/ml-100 ng/ml.

The Rock kinase inhibitor is at least one selected from the group consisting of Y27632, fasudil, and H-1152. The preferred Rock inhibitor is Y27632. The content of the Rock inhibitor is 2 μM-50 μM, preferably 5 μM-10 μM.

In addition, the cell culture medium of the invention does not contain the serum components necessary for the reported culture mediums for primary gastrointestinal stromal tumor cells (Fukuda et al., *Oncology Reports*, 2013, 30: 71-78; Liu et al., *Nat Protoc.* 2017, 12(2): 439-451), thereby avoiding interference from excessive proliferation of fibroblasts.

A second aspect of the invention is to provide a culture method for culturing primary gastrointestinal stromal tumor cells, wherein the culture method comprises the following steps:
(1) preparing the cell culture medium of the invention;
(2) coating a culture vessel with collagen;
(3) inoculating primary gastrointestinal stromal tumor cells in the coated culture vessel, culturing the cells under an oxygen concentration of 0.1%-25% by using the cell medium of the invention, and digesting the cells for subculture when the primary gastrointestinal stromal tumor cells grow to a cell density that accounts for about 80%-90% of the bottom area of the culture vessel.

Wherein, the collagen used in the culture method is rat tail collagen type I, for example, the commercial Collagen I (manufactured by Corning) can be used. More specifically, collagen is diluted with ultrapure water at a dilution ratio of 1:5-1:100, preferably at a dilution ratio of 1:10-1:50.

The coating method involves adding the diluted collagen into the culture vessel to cover the bottom of the vessel completely, and standing for 30 minutes or more.

The primary gastrointestinal stromal tumor cells can be derived from patient-derived gastrointestinal stromal tumor tissues.

For example, the collection of tissue samples mentioned above is carried out within half an hour after surgical resection or biopsy from the patient. More specifically, in a sterile environment, the tissue sample from non-necrotic sites is cut, with a volume of 0.5 $cm^3$ or more, and then is placed in pre-cooled 10-50 mL DMEM/F12 medium, which is contained in a plastic sterile centrifuge tube with a lid, and transported to a laboratory on ice; wherein, the DMEM/F12 medium contains 50-200 U/mL (e.g. 100 U/mL) penicillin and 50-200 μg/mL (e.g. 100 μg/mL) streptomycin (hereinafter referred to as the "transport fluid").

In a biosafety cabinet, the tissue sample is transferred to a cell culture dish, which is then rinsed with the transport fluid, the blood cells on the surface of the tissue sample are washed off, and unnecessary tissues such as skin and fascia on the surface of the tissue sample are removed.

The rinsed tissue sample is transferred to another new culture dish, with the addition of 5-25 mL of the transport fluid, and the tissue sample is divided into tissue fragments less than 1 $mm^3$ in diameter using a sterile scalpel blade and forceps.

The tissue sample fragments are transferred to a centrifuge tube, which is centrifuged at 1000 rpm or more for 3-10 minutes in a tabletop centrifuge; after carefully removing the supernatant from the centrifuge tube with a pipette, the resultant is resuspended using 5-25 mL of serum-free DMEM/F12 medium containing collagenase II (0.5-5 mg/ml, e.g. 1 mg/mL) and collagenase IV (0.5-5 mg/mL, e.g. 1 mg/mL), and is shaken digested on a shaker with constant temperature of 37° C. for at least 30 minutes (digestion time depends on the sample size; if the sample is larger than 1 g, the digestion time is increased to 1.5-2 hours); then it is centrifuged at 300 g/min or more for 3-10 minutes in a tabletop centrifuge; after discarding the supernatant, the digested tissue cells are resuspended with 5-25 mL of DMEM/F12 medium containing, for example, 10% fetal bovine serum, and then is grinded and sieved, with a cell sieve aperture of, for example, 100 μm; the sieved cell suspension is collected in a centrifuge tube; the cells are counted with a hemocytometer.

The cell suspension is then centrifuged at 300 g/min or more for 3-10 minutes in a centrifuge; after discarding the supernatant, the resultant is resuspended in the cell culture medium of the invention, and then inoculated in a coated culture vessel at a density of $1\times10^3$-$1\times10^5$ cells/mL for culture.

In the culture method, in the step of culturing primary gastrointestinal stromal tumor cells, it is preferred to culture under an oxygen concentration of 0.1% to 4%.

A third aspect of the invention provides a method for evaluating the efficacy of gastrointestinal stromal tumor drugs or screening gastrointestinal stromal tumor drugs, which involves using the culture medium and the culture method of the invention to obtain expanded cell progenies of gastrointestinal stromal tumor cells, and applying the same in a method and a use for efficacy evaluation and screening of drugs, especially a method and a use for efficacy evaluation and screening of anti-tumor drugs in vitro.

Preferably, the method for evaluating the efficacy of gastrointestinal stromal tumor drugs or screening gastrointestinal stromal tumor drugs comprises the following steps:
(1) obtaining primary gastrointestinal stromal tumor cells and culturing the same by using the culture medium and the culture method of the invention to obtain gastrointestinal stromal tumor cells;
(2) preparing the drugs to be tested with the required concentration gradients;
(3) adding different concentrations of the drug prepared in step (2) into the gastrointestinal stromal tumor cells cultured in step (1); and
(4) detecting the cell viability.

The beneficial effects of the invention include:
(1) the gastrointestinal stromal tumor cells cultured in vitro using the culture medium and the culture method of the invention can maintain the pathological phenotype and the heterogeneity of the owner patient of the cells, and can be applied in the field of regenerative medicine;
(2) the cultured gastrointestinal stromal tumor cells are not interfered by cells such as fibroblasts, and purified gastrointestinal stromal tumor cells and their progenies can be obtained;
(3) the composition of the culture medium does not contain uncertain components such as serum, and thus, it is not affected by the quality and quantity of the serum from different batches;
(4) this technology can provide gastrointestinal stromal tumor cells with high uniformity, which has controllable cost and is suitable for the fields of drug efficacy evaluation and screening, as well as toxicity testing, including high-throughput screening of new candidate compounds and high-throughput drug sensitivity functional tests in vitro for patients.

Using the cell culture medium of this embodiment, gastrointestinal stromal tumor cells derived from humans or other mammals, or tissues comprising at least any of these cells, can be cultured to obtain expanded and corresponding progenies of gastrointestinal stromal tumor cells.

In addition, the cells obtained by the culture method of this embodiment can be used in regenerative medicine, toxicity testing, basic medical research on gastrointestinal stromal tumor cells, screening of drug responses, determination of in vitro metabolic stability and metabolic spectrum of drugs, and development of new drugs targeting gastrointestinal stromal tumors, and the like.

DETAILED DESCRIPTION OF THE INVENTION

Example 1

Isolation of human primary gastrointestinal stromal tumor cells and optimization of culture medium for gastrointestinal stromal tumor cells
(1) Isolation of Human Primary Gastrointestinal Stromal Tumor Cells The commercial penicillin-streptomycin double-antibody solution (manufactured by Corning Inc., containing 10000 U/ml penicillin and 10 mg/ml streptomycin) was added to DMEM/F12 medium (manufactured by Corning) at a volume ratio of 2%, for transporting and washing of samples, which is referred to as "transport fluid" hereinafter.

The tissue samples of gastrointestinal stromal tumors were obtained from the surgically removed cancer tissue samples from four patients with gastrointestinal stromal tumors who had given informed consent, namely GIST-1, GIST-2, GIST-3, and GIST-4. One of the samples (GIST-1) is illustrated below. The aforementioned tissue samples were collected within half an hour after the surgical excision from patients. More specifically, in a sterile environment, tissue samples from non-necrotic areas were taken with a volume of 0.5 $cm^3$ or more and were placed in a pre-cooled transport fluid, which were then transported to the laboratory on ice.

In a biosafety cabinet, the tissue sample (GIST-1) was transferred to a 100 mm cell culture dish, and was rinsed with transport fluid. The blood cells on the surface of the tissue sample were washed off, and unwanted tissues such as skin and fascia on the surface of the tissue sample were removed.

The rinsed tissue sample was transferred to another new 100 mm culture dish, to which 10 mL of transport fluid was added, and the tissue sample was divided into tissue fragments less than 1 $mm^3$ in diameter using sterile scalpel blades and forceps.

The tissue sample fragments were transferred to a 50 mL centrifuge tube, and centrifuged at 1200 rpm for 5 minutes using a tabletop centrifuge; after carefully removing the supernatant from the centrifuge tube with a pipette, the resultant was resuspended in 10 mL serum-free DMEM/F12 medium containing collagenase II (1 mg/mL) (manufactured by Sigma) and collagenase IV (1 mg/mL) (manufactured by Sigma); it was placed on a shaker with constant temperature of 37° C. for shaking digestion for 30-90 minutes, and then was centrifuged at 350 g/min in a tabletop centrifuge for 5 minutes; after discarding the supernatant, the digested tissue cells were resuspended in 10 mL of DMEM/F12 medium containing 10% fetal bovine serum (manufactured by Gibco), and then the resultant was grinded and sieved, with the cell sieve aperture of 100 μm; the sieved cell suspension was collected in a 50 ml centrifuge tube; the cells were counted with a hemocytometer.

The cell suspension was then centrifuged at 350 g/min for 5 minutes in a centrifuge; after discarding the supernatant, the resultant was resuspended in the following described culture medium for primary gastrointestinal stromal tumor cells.

Three other gastrointestinal stromal tumor tissue samples were isolated using the same method as above.

(2) Coating of Cell Culture Plates

Rat tail collagen type I (Collagen type I, manufactured by Corning Inc.) was diluted with ultrapure water in a ratio of 1:50 to prepare a collagen diluent. The collagen diluent was added 500 μl/well into a 24-well culture plate to completely cover the bottom of the culture plate wells. After standing in a incubator at 37° C. for 1 hour, the collagen diluent was removed to provide a culture plate coated with collagen.

(3) Screening of Factors Added to the Culture Medium for Primary Gastrointestinal Stromal Tumor Cells First, a basic medium was prepared. To a commercial DMEM/F-12 medium, GlutaMAX-I (manufactured by Thermo Fisher SCIENTIFIC) was added at a dilution ratio of 1:100, insulin-containing culture additive Insulin-Transferrin-Selenium-Ethanolamine (ITS-X, manufactured by Gibco) was added at a dilution ratio of 1:100, a ROCK kinase inhibitor Y27632 (manufactured by Sigma) was added at a final concentration of 10 UM, and commercial Primocin solution (manufactured by InvivoGen) (commercial product in concentration of 50 mg/ml) was added at a dilution ratio of 1:500, to obtain the basic medium.

Next, different types of additives (Table 1) were added to the basic medium to prepare culture mediums for gastrointestinal stromal tumor cells containing different components. The culture mediums with different components were added at a volume of 500 μl/well to 24-well plates coated with Collagen I, with 3 wells for per medium formulation. The GIST cells (GIST-1) isolated from GIST tissues in Section (1) of this example were inoculated in the 24-well culture plate coated with Collagen I at a cell density of $3 \times 10^4$/well, and were cultured under different medium formulations at 37° C., under 5% $CO_2$ concentration and 2% oxygen concentration. The mediums were renewed every 3 days after the start of the culture. After 14 days of culture, cell counts were performed. As an experimental control, basic medium without any additional factors shown in Table 1 was used.

The tumor cells isolated from the other three gastrointestinal stromal tumor tissue samples were also cultured and counted in the same manner as above.

The statistical results are shown in Table 1.

TABLE 1

| No. | Medium additive | Supplier | Concentration | Level of promoting cell proliferation |
|---|---|---|---|---|
| 1 | N2 | Gibco | 100X | ++ |
| 2 | epidermal growth factor | R&D | 20 ng/ml | ○ |
| 3 | platelet-derived growth factor AA | R&D | 50 ng/ml | ++ |
| 4 | platelet-derived growth factor BB | R&D | 50 ng/ml | + |
| 5 | platelet-derived growth factor CC | R&D | 50 ng/ml | + |
| 6 | platelet-derived growth factor DD | R&D | 50 ng/ml | ○ |
| 7 | stem cell factor | R&D | 100 ng/ml | +++ |
| 8 | insulin-like growth factor 1 | Peprotech | 50 ng/ml | + |
| 9 | basic fibroblast growth factor | R&D | 20 ng/ml | ++ |
| 10 | bovine pituitary extract | MACGENE | 60 μg/ml | ○ |
| 11 | B27 | Gibco | 50X | − |
| 12 | oleoyl-L-α-lysophosphatidic acid sodium salt | Sigma | 1 μM | ○ |
| 13 | prostaglandin E2 | Tocris | 1 μM | ○ |
| 14 | cholera toxin | Sigma | 0.1 nM | ○ |
| 15 | hydrocortisone | Sigma | 25 ng/ml | ○ |
| 16 | 2-phospho-L-ascorbic acid trisodium salt | Sigma | 50 μg/ml | ○ |
| 17 | acidic fibroblast growth factor | Absin | 1 nM | ○ |
| 18 | fibroblast growth factor 10 | R&D | 100 ng/ml | + |
| 19 | interleukin-6 | R&D | 10 ng/ml | ○ |
| 20 | interleukin-22 | R&D | 10 ng/ml | ○ |
| 21 | gastrin | AnaSpec | 1 nM | ++ |

Wherein, "+" indicates that compared with the basic medium, the medium added with the additive(s) has the effect of promoting the proliferation of primary gastrointestinal stromal tumor cells isolated from gastrointestinal stromal tumor tissue in at least three cases, with the number of "+" indicates the degree of promoting effect; "−" indicates that the medium added with the additive(s) has the effect of inhibiting the proliferation of primary gastrointestinal stromal tumor cells isolated from gastrointestinal stromal tumor tissue in at least two cases; "○" indicates that the medium added with the additive(s) has no significant effect on the proliferation of primary gastrointestinal stromal tumor cells isolated from gastrointestinal stromal tumor tissue in at least three cases. The results showed that N2, platelet-derived growth factor AA-CC, stem cell factor, insulin growth factor 1, basic fibroblast growth factor, fibroblast growth factor 10, and gastrin could promote the proliferation of primary gastrointestinal stromal tumor cells isolated from gastrointestinal stromal tumor tissue in at least three cases, among which, N2, platelet-derived growth factor AA, stem cell factor, basic fibroblast growth factor and gastrin have stronger effects.

Figure 1A:
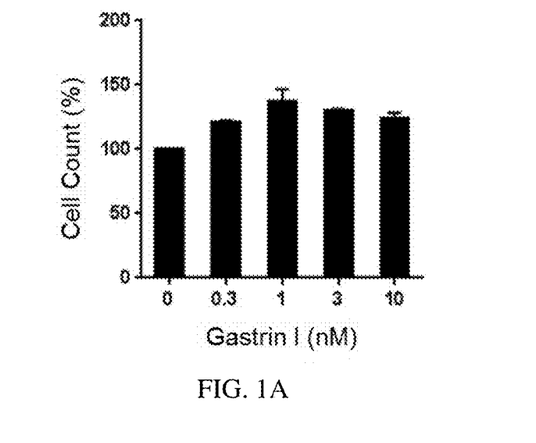
FIGS. 1A and 1B are graphs illustrating the effects of different concentrations of gastrin I and N2 in the culture medium on the proliferation of primary gastrointestinal stromal tumor cells in vitro.

(4) Optimization of Concentration of Factors Added to Culture Medium for Primary Gastrointestinal Stromal Tumor Cells Gastrin I (manufactured by Anaspec) was added into the basic medium to prepare the culture mediums for gastrointestinal stromal tumor cells containing gastrin I in the final concentrations of 0.3 nM, 1 nM, 3 nM, 10 nM, which were added at a volume of 500 μl/well to a 24-well plate coated with Collagen I, with 3 wells for each concentration. The primary gastrointestinal stromal tumor cells (GIST-1) isolated from gastrointestinal stromal tumor tissue in Section (1) of this example were inoculated in a 24-well culture plate coated with Collagen I at a cell density of $3\times10^4$/well, and were cultured under medium formulations with different concentrations of gastrin I at 37° C., under 5% $CO_2$ concentration and 2% oxygen concentration. The mediums were renewed every 3 days after the start of the culture. After 14 days of culture, cell counts were performed. Basic medium, with gastrin I concentration of 0 nM, as an experimental control was used. The results are shown in FIG. 1A.

Figure 1B:
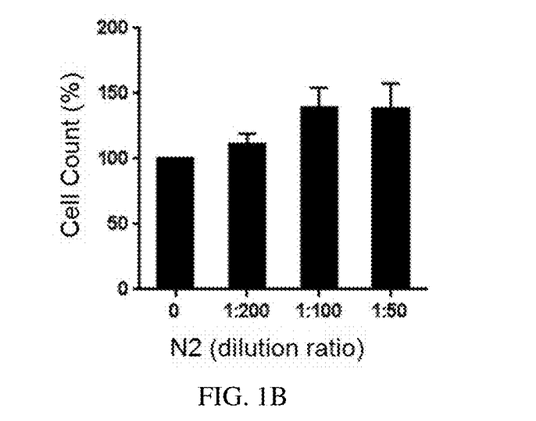

N2 additive (manufactured by Thermo Fisher) was added into the basic medium at a dilution ratio of 1:200, 1:100, 1:50, to prepare the culture mediums for gastrointestinal stromal tumor cells with different concentrations of N2. The different formulations of mediums were added at a volume of 500 μl/well to a 24-well plate coated with Collagen I, with 3 wells for each concentration. The culture and the count of primary cells were performed as above. Basic medium, with N2 concentration of 0, was used as an experimental control. The results are shown in FIG. 1B.

Figure 2A:
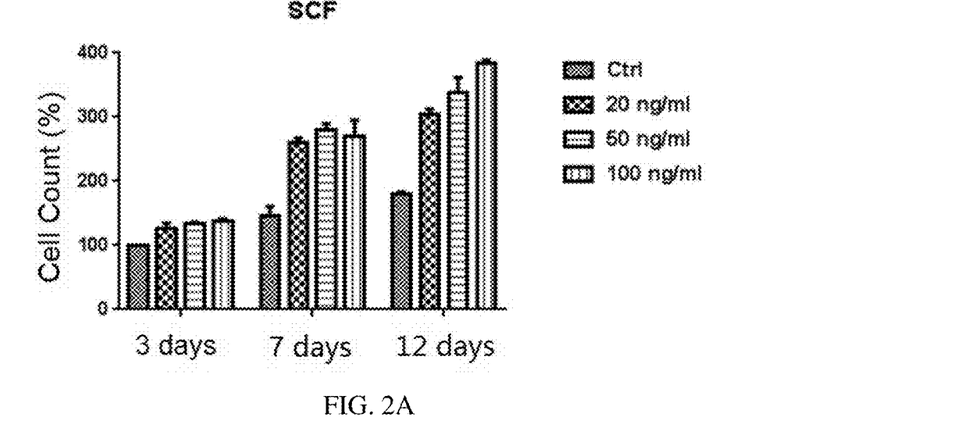
FIGS. 2A to 2C are graphs illustrating the effects of different concentrations of different receptor tyrosine kinase ligands in culture medium on the proliferation of primary gastrointestinal stromal tumor cells in vitro.

Then, 1:100 diluted N2 and 1 nM gastrin were added into basic medium to prepare basic medium 2. In the basic medium 2, stem cell factor (SCF, manufactured by R&D) was added to prepare the culture mediums for gastrointestinal stromal tumor cells containing SCF with final concentrations of 20 ng/ml, 50 ng/ml, and 100 ng/ml, respectively. The culture mediums containing different concentrations of SCF were added at a volume of 500 μl/well to a 24-well plate coated with Collagen I, with 3 wells for each concentration. The primary gastrointestinal stromal tumor cells (GIST-1) isolated from gastrointestinal stromal tumor tissue in Section (1) of this example were inoculated in a 24-well culture plate coated with Collagen I at a cell density of $4\times10^4$/well, and were cultured under medium formulations with different concentrations of SCF at 37° C., under 5% $CO_2$ concentration and 2% oxygen concentration. Cell counts were performed on primary GIST cells cultured with different medium formulations on the 3rd, 7th, and 12th days. The results are shown in FIG. 2A.

Figure 2B:
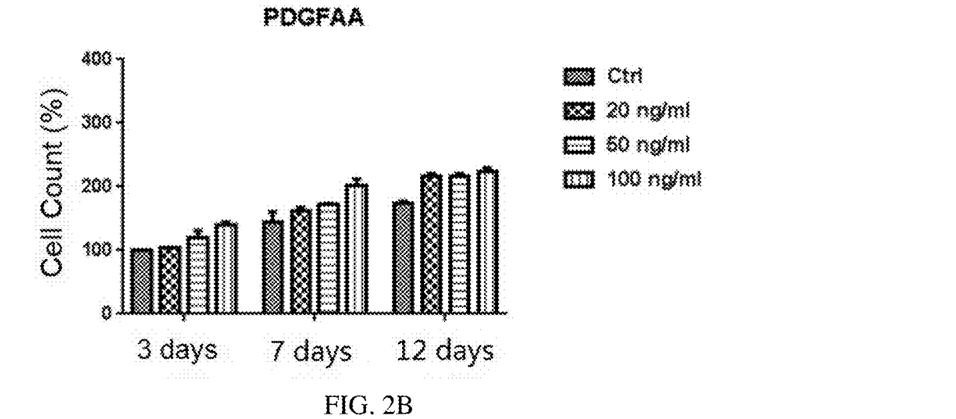
Figure 2C:
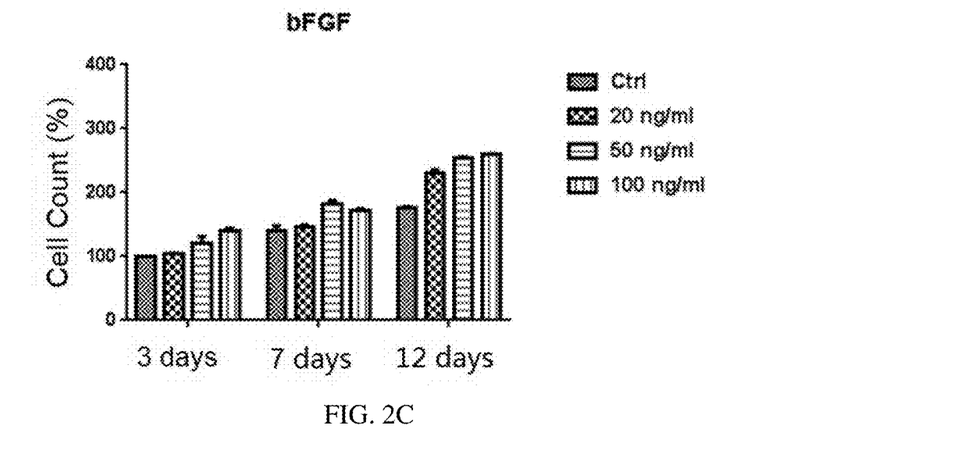

Similarly, culture mediums for gastrointestinal stromal tumor cell containing different concentrations of platelet-derived growth factor AA (PDGFAA, manufactured by R&D) and basic fibroblast growth factor (bFGF, manufactured by R&D) were prepared using basic medium 2, with final concentrations of 20 ng/ml, 50 ng/ml, and 100 ng/ml, respectively. The culture and the count of primary cells were performed as above. The results are shown in FIGS. 2B and 2C.

The results showed that adding different concentrations of the receptor tyrosine kinase ligands SCF, bFGF, and PDGFAA to basic medium 2 had a time-dependent and dose-dependent proliferative effect on the in vitro proliferation of primary GIST cells.

(5) Study on the Proliferative Effects of Each Factor in Different Concentrations Added in Culture Mediums for Primary Gastrointestinal Stromal Tumor Cells The following 6 different formulations of mediums were further prepared:

1. Basic medium (hereinafter referred to as BM): the basic medium prepared in Section (3) of Example 1;
2. Formulation 2: basic medium with the addition of 1:100 diluted N2, 1 nM gastrin, 100 ng/ml PDGFAA and 20 ng/ml bFGF, respectively;
3. Formulation 3: basic medium with the addition of 1:100 diluted N2, 1 nM gastrin, 100 ng/ml PDGFAA and 50 ng/ml SCF, respectively;
4. Formulation 4: basic medium with the addition of 1:100 diluted N2, 1 nM gastrin, 50 ng/ml SCF and 20 ng/ml bFGF, respectively;
5. Formulation 5: basic medium with the addition of 1:100 diluted N2, 100 ng/ml PDGFAA, 50 ng/ml SCF, and 20 ng/ml bFGF, respectively;
6. Formulation 6: basic medium with the addition of 1 nM gastrin, 100 ng/ml PDGFAA, 50 ng/ml SCF and 20 ng/ml bFGF, respectively;
7. Complete medium (hereinafter referred to as CM): basic medium with the addition of 1:100 diluted N2, 1 nM gastrin, 100 ng/ml PDGFAA, 50 ng/ml SCF and 20 ng/ml bFGF, respectively.

Firstly, the proliferative effects of basic medium and complete medium on primary GIST cells in vitro were compared. The basic medium and the complete medium were added to a 24-well plate coated with Collagen I at a volume of 500 μl/well, with 2 wells for each group.

Figure 3A:
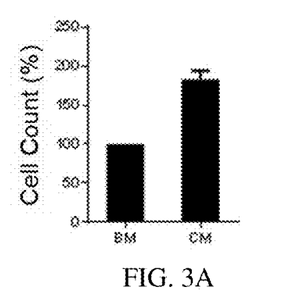
FIGS. 3A to 3F are graphs illustrating the effects of different factor combinations in the culture medium on the proliferation of primary gastrointestinal stromal tumor cells in vitro.

According to the method of Section (1) of Example 1, GIST cells (GIST-2) isolated from gastrointestinal stromal tumor tissue were inoculated in a 24-well culture plate coated with Collagen I at a cell density of $4\times10^4$ cells/well, and were cultured with two different medium formulations at 37° C., under 5% $CO_2$ concentration and 2% oxygen concentration. On the 10th day of culture, cell counts were performed on GIST cells under different medium formulations. The number of GIST cells cultured using basic medium was 100%. The results are shown in FIG. 3A. The results showed that using the complete medium increased the number of cells by approximately 70% in only 10 days compared with the case when using the basic medium.

Figure 3B:
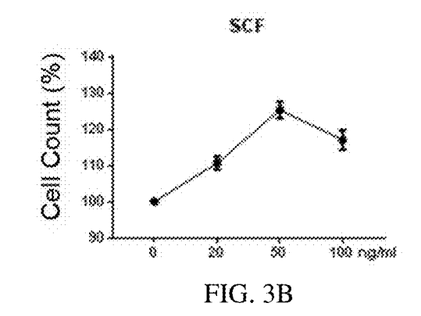

Next, on the basis of formulation 2, 20 ng/ml, 50 ng/ml and 100 ng/ml of SCF were added respectively to study the proliferation-promoting effects of different concentrations of SCF. Formulation 2 mediums containing different concentrations of SCF were added to a 24-well plate coated with Collagen I at a volume of 500 μl/well, with 2 replicate wells for each concentration. According to the same method as in Section (1) of this example, GIST-2 was inoculated in a 24-well culture plate coated with Collagen I at a cell density of $4\times10^4$ cells/well, and were cultured with formulations containing different concentrations of SCF at 37° C., under 5% $CO_2$ concentration and 2% oxygen concentration. After cultured to the 10th day, the gastrointestinal stromal tumor cells under different medium formulations were counted. The number of gastrointestinal stromal tumor cells cultured using Formulation 2 medium was 100%. The results are shown in FIG. 3B.

The results showed that compared with the case using Formulation 2 medium, the addition of SCF effectively promoted the cell proliferation, wherein, at a SCF concentration of 50 ng/ml, the number of cells could be increased by about 25% after 10 days of culture compared with the case when using Formulation 2 medium.

Figure 3C:
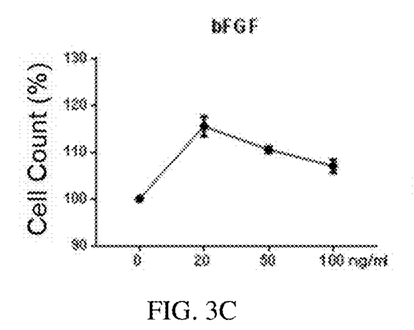

Similarly, following the same steps as in Formulation 2 above, on the basis of Formulation 3, 20 ng/ml, 50 ng/ml, and 100 ng/ml of bFGF were added respectively to study the proliferation-promoting effects of different concentrations of bFGF. The results are shown in FIG. 3C. The results showed that compared with the case using Formulation 3 medium, the addition of bFGF effectively promoted the cell proliferation, wherein, at a concentration of 20 ng/ml of bFGF, the number of cells could be increased by about 17% after 10 days of culture compared with the case when using Formulation 3 medium.

Figure 3D:
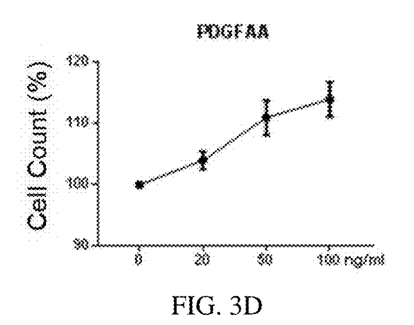

Similarly, following the same steps as in Formulation 2 above, on the basis of Formulation 4, 20 ng/ml, 50 ng/ml, and 100 ng/ml of PDGFAA were added respectively to study the proliferation-promoting effects of different concentrations of PDGFAA. The results are shown in FIG. 3D. The results showed that compared with the case using Formulation 4 medium, the addition of PDGFAA effectively promoted the cell proliferation, wherein, at a concentration of 100 ng/ml of PDGFAA, the number of cells could be increased by about 13% after 10 days of culture compared with the case when using Formulation 4 medium.

Figure 3E:
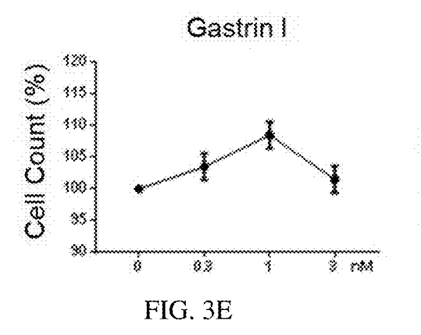

Similarly, following the same steps as in Formulation 2 above, on the basis of Formulation 5, 0.3 nM, 1 nM and 3 nM Gastrin I were added respectively to study the proliferation-promoting effects of different concentrations of Gastrin I. The results are shown in FIG. 3E. The results showed that compared with the case using Formulation 5 medium, the addition of Gastrin I could effectively promote the cell proliferation, wherein, at a concentration of 1 nM of Gastrin I, the number of cells could be increased by about 8% after 10 days of culture compared with the case when using Formulation 5 medium.

Figure 3F:
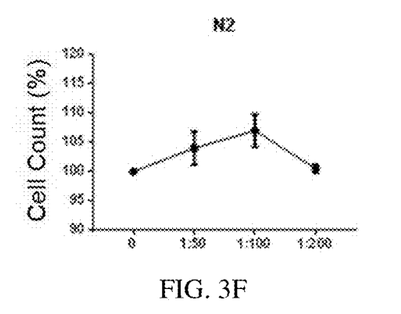

Similarly, following the same steps as in Formulation 2 above, on the basis of Formulation 6, N2 diluted at 1:200, 1:100, and 1:50 were added respectively to study the proliferation-promoting effects of different concentrations of N2. The results are shown in FIG. 3F. The results showed that compared with the case using Formulation 6 medium, the addition of N2 effectively promoted the cell proliferation, wherein, with the addition of N2 at a 1:100 dilution ratio, the number of cells could be increased by about 8% after 10 days of culture compared with the case when using Formulation 6 medium.

Example 2

Culture of Human Primary GIST Cells and Comparison with Existing Culture Methods
(1) Culture of Primary GIST Cells Derived from Human Gastrointestinal Stromal Tumor Tissue Using the same method as in Section (1) of Example 1, primary GIST cells (GIST-1, GIST-2, GIST-3) were isolated from cancer tissues of three patients with gastrointestinal stromal tumors, respectively. Next, the isolated GIST cells were counted using a hemocytometer, and then were inoculated in a 12-well plate coated with Collagen I (manufactured by Corning) at a cell density of $5\times10^4$ cells/well. Wherein, the coating method is as follows: Collagen I was prepared into a collagen diluent by diluting it with ultra-pure water at the ratio of 1:50; 1 ml/well of collagen diluent was added into a 12-well culture plate to completely cover the bottom of the wells of the plate; after standing for 1 hour in an incubator at 37° C., collagen diluent was removed to obtain a collagen-coated culture plate.

Complete medium (CM) prepared according to Section (5) of Example 1 was added into the 12-well plate in 2 mL/well and cultured at 37° C. under 5% $CO_2$ concentration and 2% oxygen concentration. The medium was renewed every 3 days after the start of the culture.

Figure 4:
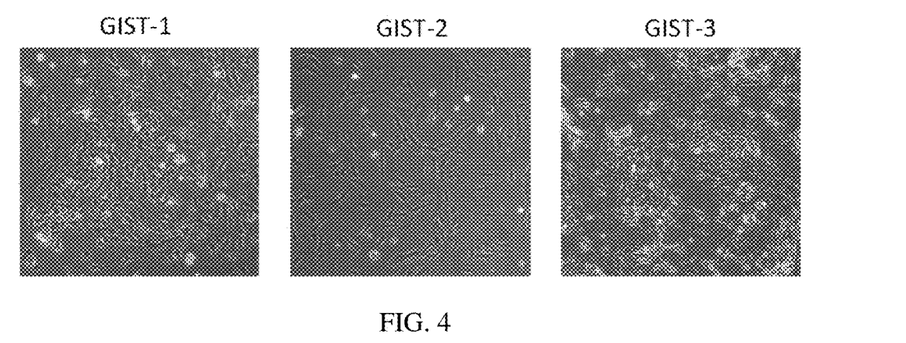
FIG. 4 shows photographs under inverted phase-contrast microscope (100× magnification) of primary gastrointestinal stromal tumor cells, which were obtained by culturing for 14 days, using the culture method for culturing gastrointestinal stromal tumor cells of the invention, the primary gastrointestinal stromal tumor cells isolated from three tissue samples of clinical gastrointestinal stromal tumor patients, respectively.

FIG. 4 are photos under 100× phase-contrast microscope of the cells cultured to the 14th day.
(2) Preparation of Existing Culture Mediums for Primary Gastrointestinal Stromal Tumor Cells As a control, the culture medium for cell conditional reprogramming technology (also referred to as "F-media" below) was prepared. The preparation procedure see (Liu et al., Am J Pathol, 183(6): 1862-1870, 2013), and the medium formulation is shown in Table 2.

TABLE 2

Medium components of cell conditional reprogramming technology

| Medium component | Supplier | Art. No. | Final concentration |
|---|---|---|---|
| DMEM medium | Corning | 10-013-CVR | 65% |
| fetal calf serum | Gibco | 16140-071 | 10% |
| Ham's F12 nutrient solution | Gibco | 11765-054 | 25% |
| hydrocortisone | Sigma-Aldrich | H-0888 | 25 ng/ml |
| epidermal growth factor | R&D | 236-EG | 0.125 ng/ml |
| insulin | Sigma-Aldrich | I-5500 | 5 μg/ml |
| amphotericin B | Sigma-Aldrich | V900919 | 250 ng/ml |
| gentamicin | Gibco | 15710-064 | 10 μg/ml |
| cholera toxin | Sigma-Aldrich | C8052 | 0.1 nM |
| Y27632 | Enzo | 270-333M025 | 10 μM |

As another control, the culture medium for primary gastrointestinal stromal tumor cells reported in the literature was prepared. For the specific steps of preparation and culture, see Fukuda et al., Oncology Reports, 2013, 30: 71-78. The culture medium formulation was: 20% calf serum was added to RPMI 1640 (manufactured by Corning), followed by the addition of commercial penicillin-streptomycin solution (manufactured by Corning) at a volume ratio of 1%, and finally SCF was added at a final concentration of 10 ng/ml, hereinafter referred to as "Known Formulation 1".
(3) Comparison of Different Culture Techniques for Gastrointestinal Stromal Tumor Cells In order to investigate the culture effects of the culture medium and culture method of the invention and the existing two culture mediums and culture methods, primary GIST cells (GIST-2) were isolated from cancer tissue of a patient with gastrointestinal stromal tumor using the same method as in Second (1) of Example 1, and GIST-2 were cultured in vitro using the following three culture conditions in parallel:

A. The technology of the invention: primary GIST cells (GIST-2) were inoculated in 12-well plates with or without the coating of Collagen I (manufactured by Corning), respectively, at an inoculated density of $5\times10^4$ cells/well, and were cultured in vitro with 2 mL/well of the complete medium CM prepared in Section (5) of Example 1 at 37° C., under 5% $CO_2$ concentration and 2% oxygen concentration;

B. Cell conditional reprogramming technology: primary GIST cells (GIST-2) were inoculated in 12-well plates with or without the coating of Collagen I (manufactured by Corning), respectively, at an inoculated density of $5\times10^4$ cells/well, and were cultured in vitro with 2 mL/well of F-media at 37° C., under 5% $CO_2$ concentration and 2% oxygen concentration;

C. Another reported technology: primary GIST cells (GIST-2) were inoculated in 12-well plates with or without the coating of Collagen I (manufactured by Corning), respectively, at an inoculated density of $5\times10^4$ cells/well, and were cultured in vitro with 2 mL/well of "Known Formulation 1" at 37° C., under 5% $CO_2$ concentration and 20% oxygen concentration.

Figure 5:
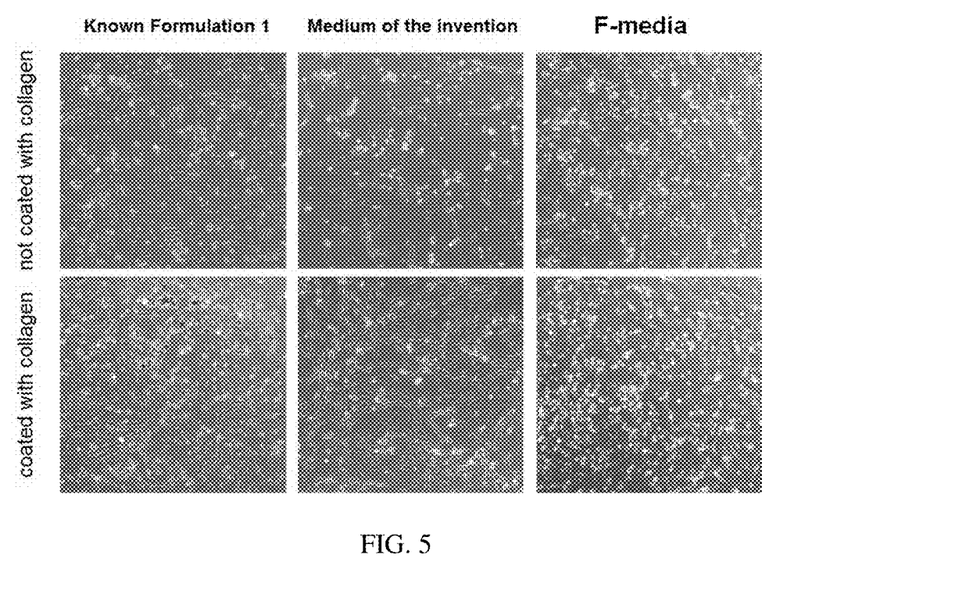
FIG. 5 shows photographs under inverted phase-contrast microscope (100× magnification) of gastrointestinal stromal tumor cells, which were obtained by culturing the primary gastrointestinal stromal tumor cells isolated from the same tissue sample of a clinical gastrointestinal stromal tumor patient; the culturing were performed parallelly for 8 days in a collagen I coated manner and an uncoated manner, respectively, using the culture method for culturing gastrointestinal stromal tumor cell of the invention and two reported culture methods for culturing primary gastrointestinal stromal tumor cell.

FIG. 5 are cell photos taken under a 100× phase-contrast microscope of GIST-2 cells cultured under different culture conditions to the 8th day.

According to FIG. 5, it can be seen that the primary GIST cells derived from gastrointestinal stromal tumor tissue can be cultured efficiently in vitro by using the culture medium for gastrointestinal stromal tumor cell and the culture method of the invention. Moreover, the culture plate coated with Collagen I may produce better proliferation efficiency over the culture plate uncoated with Collagen I, when using the GIST culture medium of the invention.

In addition, as shown in FIG. 5, compared with the culture medium and the culture method of the invention, the GIST cells cultured with Known Formulation 1 are fewer, with more cell fragments, and the culture effect without coating of Collagen I is poorer than the case with coating treatment, the GIST cells cultured with F-media are also fewer than those cultured using the culture method of the invention, and a large number of fibroblasts with thick shape and unclear outline can be seen under the microscope, which indicates that the cultured cells contain a large proportion of fibroblasts; and there is no obvious difference in the culture effect of F-media, despite of coating treatment with Collagen I or not.

Example 3

Identification of Immune Markers for Gastrointestinal Stromal Tumor Cells (1) The complete medium CM in Section (5) of Example 1, the culture mediums for gastrointestinal stromal tumor cells F-media and Known Formulation 1 in Section (2) of Example 2 were used.

(2) From a clinical surgical resection sample of a patient with gastrointestinal stromal tumor, a cancer tissue about the size of a soybean grain was taken. Primary gastrointestinal stromal tumor cells (GIST-1) were isolated using the same method as in Section (1) of Example 1, and the primary gastrointestinal stromal tumor cells (GIST-1) were cultured using the culture methods A, B, and C in Section (3) of Example 2, respectively.

(3) Immunofluorescence was used to detect the expression of important cancer-related biomarkers on human gastrointestinal stromal tumor cells.

The primary antibodies used in this experiment were CKIT (CD117) (manufactured by Cell Signaling Technology) and $\alpha$-SMA (manufactured by Cell Signaling Technology). The secondary antibody Anti-Mouse IgG (H+L), F(ab')2 Fragment (Alexa Fluor® 488 Conjugate) (manufactured by Cell Signaling Technology) was used for targeting CKIT (CD117); the secondary antibody Anti-Rabbit IgG (H+L), F(ab')2 Fragment (Alexa Fluor® 594 Conjugate) (manufactured by Cell Signaling Technology) was used for targeting $\alpha$-SMA. Wherein, CKIT is an important biomarker for gastrointestinal stromal tumors, and fibroblasts do not express CKIT protein. In clinical practice, CKIT is commonly used for differential diagnosis of gastrointestinal stromal tumors. $\alpha$-SMA is recognized as an important biomarker for fibroblasts.

Specifically, when GIST cells accounted for about 80% of the bottom area of the culture plate, the medium supernatant in the original 12-well plate was discarded, and 1 mL of 0.05% trypsin (manufactured by Thermo Fisher) was added to digest the cells; after being incubated at 37° C. for 15 minutes, the digested cells were resuspended in 5 mL DMEM/F12 medium containing 10% (v/v) calf serum, 100 U/mL penicillin and 100 μg/mL streptomycin, and then collected into a centrifuge tube, and centrifuged at 300 g/min for 5 minutes. The cell precipitates of each group after centrifugation were resuspended using the complete medium CM of the invention, F-media and Known Formulation 1, respectively, and the cells in the cell suspensions were counted using a hemocytometer. The cells were inoculated onto coverslips coated with Collagen I at a density of $4\times10^4$ cells/coverslip, and the coating method was the same as Section (2) of Example 1, and the cells of each group were cultured using the complete medium CM of the invention, F-media and Known Formulation 1, respectively, to grow the cells on the coverslips.

After 14 days of culture, the cells were rinsed twice with PBS buffer, fixed with 4% paraformaldehyde for 15 minutes, and then incubated at room temperature with TBST (TBS+ 0.1% Tween 20) containing 1% BSA (manufactured by Shanghai Sangon Biotech) and 1% Triton X-100 for one hour. The cells were rinsed with TBST buffer 3 times, 3 minutes each time. After removing the TBST buffer, 50 μL diluent of primary antibody (1:2000 times diluted CKIT antibody) was dropped onto the slide, and the resultant was incubated at 4° C. for 12-16 h and then rinsed with PBS 3 times, 3 minutes each time; secondary antibody Anti-Rabbit IgG (H+L), F(ab')2 Fragment (Alexa Fluor® 594 Conjugate) (8 μg/ml) was dropped onto the slide, and the resultant was incubated at room temperature for 60 minutes, and then rinsed with PBS 3 times, 3 minutes each time. Next, secondary antibody Anti-Rabbit IgG (H+L), F(ab')2 Fragment (Alexa Fluor® 594 Conjugate) (8 μg/ml) was dropped onto the slide, and the resultant was incubated at room temperature for 60 minutes, and then rinsed with PBS 3 times, 3 minutes each time. 1 μg/ml DAPI dye (manufactured by Sigma) was used to incubate the cells for 10 minutes. The cells were rinsed with PBS once. After the coverslip was sealed with a drop of a mounting medium (manufactured by Thermo Fisher Scientific), the resultant was photographed under a 100× fluorescence microscope.

In addition, as a positive control, the accepted gastrointestinal stromal tumor cell line GIST-T1 (purchased from ATCC) was used. When the primary cells were cultured to the 13th day, $8\times10^4$ GIST-T1 cells were placed on a coverslip and the cells were grown on the coverslip for 24 hours. The cells were subjected to immunofluorescence staining in the same manner as the above-mentioned GIST-1 cultured by various methods, and photographed.

Figure 6A:
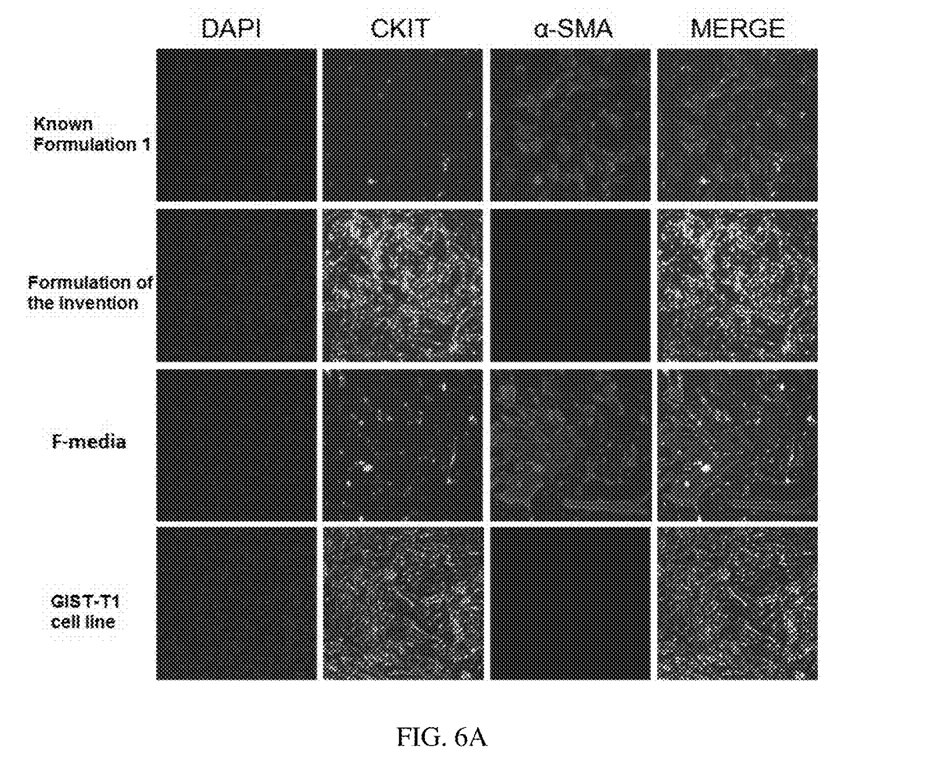
FIG. 6A shows the result (under 100× microscope) of immunofluorescence staining of specific biomarkers of gastrointestinal stromal tumor cells and fibroblasts performed on the gastrointestinal stromal tumor cells, which were obtained by culturing the primary gastrointestinal stromal tumor cells isolated from a clinical tissue sample of gastrointestinal stromal tumor; the culturing were performed parallelly for 14 days, using the culture method for culturing gastrointestinal stromal tumor cells of the invention and two reported culture methods for culturing gastrointestinal stromal tumor cells, respectively, wherein, GIST-T1 cells were used as positive control.

The results are shown in FIG. 6A.

According to FIG. 6A, the gastrointestinal stromal tumor cell line GIST-T1 highly expresses the specific biomarker CKIT protein for GIST cells, but not $\alpha$-SMA protein; the cells cultured with the culture medium and the culture method of the invention also highly express the specific biomarker CKIT protein for GIST cells, and do not express $\alpha$-SMA protein; while primary GIST cells derived from the same sample and cultured with F-media or Known Formulation 1 rarely express CKIT protein, and most of them only express specific biomarker for fibroblasts, $\alpha$-SMA protein, and the cells were in sheet-like and muscle fiber-like morphology, indicating that these two culture techniques cannot efficiently culture GIST cells and most of the cultured cells are fibroblasts, which cannot achieve the culture effect of the culture medium of the invention.

Figure 6B:
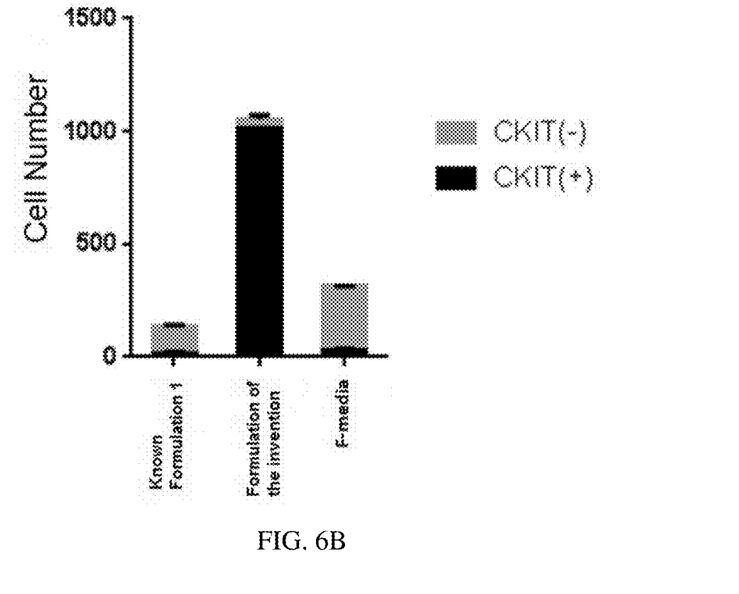
FIG. 6B shows the result of the statistical analysis of the numbers of CKIT-positive and CKIT-negative labeled cells after staining the cells obtained from the three different culture methods mentioned above.

FIG. 6B shows the data analysis result by counting CKIT-positive labeled cells and CKIT-negative labeled cells under the microscope after staining the cells obtained by the three different culture methods mentioned above. The result is the counting statistics of three random fields under the view of the microphotographs.

From FIGS. 6A and 6B, it can be confirmed that compared with the two reported culture techniques, the technology of the invention achieves efficient expanding of the patient-derived primary GIST cells in vitro, and the cultured cells are not affected by interference of fibroblasts.

Example 4

Continuous Culture of Primary GIST Cells In Vitro

According to the same method as in Section (1) of Example 2, GIST-3 cells were continuously cultured using the complete medium CM in Section (5) of Example 1.

The culture medium was renewed every 3 days for the cells cultured under the conditions of the invention.

When GIST cells grew to cover about 80% of the bottom area in the culture plate, the medium supernatant in the original 12-well plate was discarded. 1 mL of 0.05% trypsin (Thermo Fisher: 25300062) was added to digest the cells, and the cells were incubated at 37° C. for 15 minutes. After the cells were completely digested, the digested cells were resuspended in 5 mL DMEM/F12 medium containing 10% (v/v) calf serum, 100 U/mL penicillin and 100 µg/ml streptomycin, and then collected into a centrifuge tube, and centrifuged at 350 g/min for 5 minutes. The cell precipitates after centrifugation were resuspended using the complete medium CM, and the cells in the cell suspension were counted using a hemocytometer. The cells were inoculated into another 12-well culture plate coated with Collagen I at a cell density of $5\times10^4$ cells/well for further culture.

When the growth of the subcultured cells reached about 80% of the bottom area in the culture plate again, the cultured cells were digested, collected and counted again in accordance with the above-mentioned operation method. The cells were inoculated at a density of $5\times10^4$ cells/well again for further culture.

Figure 7:
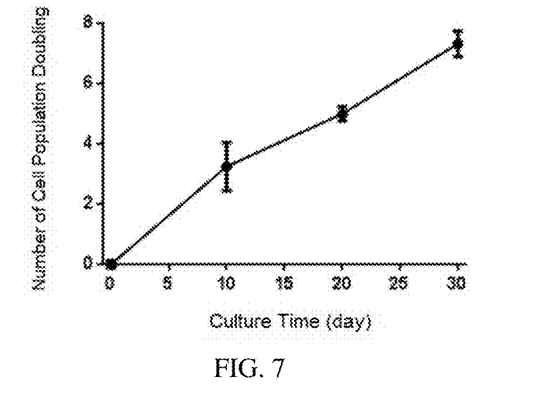
FIG. 7 is a cell growth curve obtained by continuously culturing for 30 days, using the culture method for culturing gastrointestinal stromal tumor cell of the invention, the primary gastrointestinal stromal tumor cells isolated from a clinical tissue sample of gastrointestinal stromal tumor.

The following is the formulation for calculating the cell population doubling number of primary gastrointestinal stromal tumorcells under different culture conditions:

$$\text{Cell population doubling number} = [\log(N/X_0)]/\log 2$$

where N is the number of cells for the passage and $X_0$ is the number of cells at initial inoculation (see Greenwood et al., Environ Mol Mutagen 2004, 43(1): 36-44).

FIG. 7 is the growth curve of one case of gastrointestinal stromal tumor cells under the culture conditions of the invention drawn by Graphpad Prism7.0 software, which takes the culture days as the abscissa and the cell population doubling number as the ordinate. From FIG. 7, it can be confirmed that GIST cells cultured by the culture medium for gastrointestinal stromal tumor cells of the invention can continuously proliferate for at least 30 days. In addition, when using existing F-media and Known Formulation 1 to culture primary GIST cells, according to the results of Example 3, purified GIST cells cannot be cultured, and the cultured cells were interfered by a large number of fibroblasts. Therefore, it is not possible to investigate the in vitro sustained expansion effect of existing F-media and Known Formulation 1 on primary GIST cells.

Example 5

Analysis of Gene Mutation Consistency of Primary GIST Cells

According to the same method as in Section (1) of Example 2, primary GIST cells, GIST-1, GIST-2, and GIST-3, were cultured using the complete medium CM in Section (5) of Example 1, respectively.

On the 20th day of culture, the gastrointestinal stromal tumor cells were collected, and the genomic DNA of the cells was extracted using DNeasy blood & tissue kit (manufactured by QIAGEN). In addition, the gastrointestinal stromal tumor tissue of the patient corresponding to the source of the cells was collected, and the genomic DNA of the cells was extracted using DNeasy blood & tissue kit (QIAGEN). 2 mL of peripheral blood from the patient who donates the cells was collected, and the blood genomic DNA was extracted using DNeasy blood & tissue kit (QIAGEN) as a background control.

Subsequently, whole-exome sequencing was performed on the genomic DNA of the cells and the tissue samples (for detailed procedures, see Hans Clevers et al., Cell, 11; 172(1-2): 373-386, 2018), and the sequencing results were analyzed for tumor high-frequency mutation using MuSiC software. MuSiC took the gene mutation in the peripheral blood of the corresponding patient as the background, performed statistical tests on each mutation type on the gene, and detected the gene with a significantly higher mutation rate than the background. The analysis results were produced using the software available at https://bioinfogp.cnb.csic.es/tools/venny/index.html. The analysis results are shown in FIG. 8.

Figure 8:
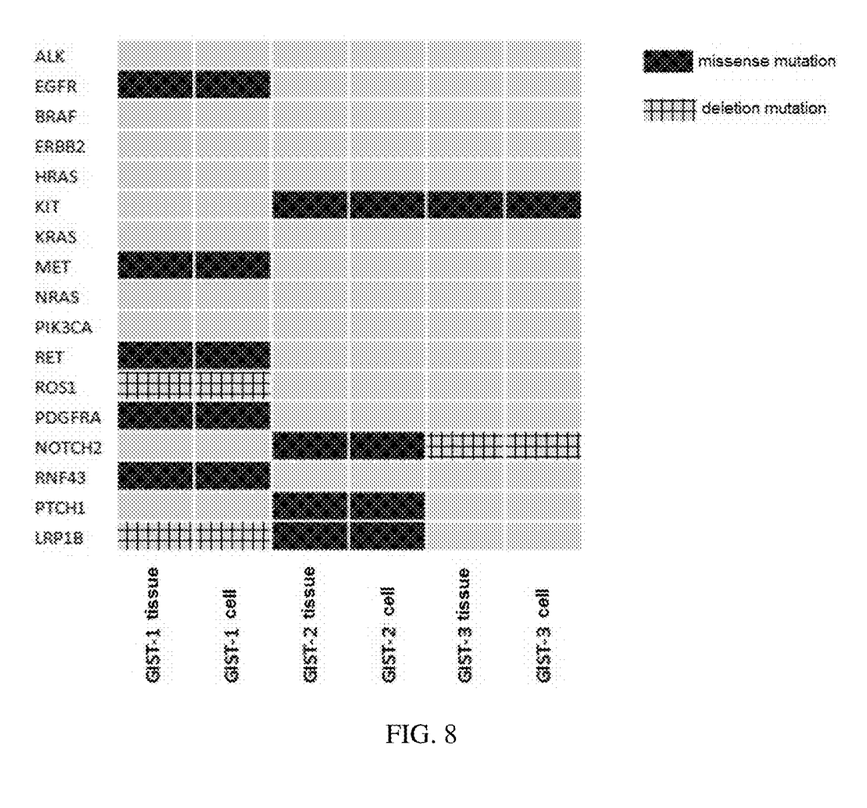
FIG. 8 shows the result of gene mutation consistency analysis between three surgical resection samples of gastrointestinal stromal tumor and the gastrointestinal stromal tumor cells obtained by culturing the primary gastrointestinal stromal tumor cells derived from corresponding samples using the culture method for culturing gastrointestinal stromal tumor cell of the invention.

The high-frequency mutation analysis results of the tumor in FIG. 8 show that the high-frequency mutation genes between the GIST cells cultured using the culture medium for gastrointestinal stromal tumor cells of the invention and the original tissue of the gastrointestinal stromal tumor are basically consistent. That is to say, the GIST cells cultured using the culture medium for gastrointestinal stromal tumor cells of the invention can maintain the original gene mutation characteristics of the cancer tissue of the patient.

Example 6

Drug Sensitivity Test of GIST Cells

Taking surgical resection samples from patients with gastrointestinal stromal tumors as an example, it is demonstrated that GIST cells cultured from patient-derived gastrointestinal stromal tumor tissue samples can be used to test the sensitivity of the tumor cells of the patient to different drugs.

1. Plating of primary GIST cells: the GIST cells (GIST-1 and GIST-2) cultured by the method described in Section (1) of Example 2 by using the complete medium CM in Section (5) of Example 1 were inoculated into a 384-well plate at a density of 3000-5000 cells/well, and the cells were adhered overnight.

2. Drug Gradient Experiments:

(1) The drug storage plates were prepared by gradient dilution method: 10 µL of the drug stock solutions to be tested (the concentration of the drug stock solution was determined based on 2 times of the maximum blood concentration Cmax of the drug in the human body) were respectively taken, and added to 0.5 mL EP tubes containing 20 μL of DMSO; 10 μL of solutions from the above EP tubes were pipetted into second 0.5 mL EP tubes loaded with 20 μL of DMSO, that is, diluting the drugs in a ratio of 1:3. The above method was repeated for gradually dilution and 6 concentrations required for dosing were obtained. Different concentrations of drugs were added to the 384-well drug storage plates. Equal volume of DMSO was added to each well of the solvent control group as a control. In this example, the drugs to be tested were Imatinib (manufactured by MCE), Sunitinib (manufactured by MCE), Regorafenib (manufactured by MCE), which were clinically approved as the agents for treating gastrointestinal stromal tumor.

(2) Using a high-throughput automated workstation (purchased from Perkin Elmer), different concentrations of drugs and solvent controls in the 384-well drug storage plates were added to 384-well cell culture plates plated with the gastrointestinal stromal tumor cells. The drug groups and the solvent control groups were each arranged with 3 duplicate wells. The volume of drugs added to each well was 100 nL.

(3) Test of cell viability: 72 hours after administration, Cell Titer-Glo assay kit (manufactured by Promega) was used to detect the chemiluminescence value of the cultured cells after drug administration. The magnitude of the chemiluminescence value reflects the cell viability and the effect of the drug on the cell viability. The prepared Cell Titer-Glo detection solution was added to each well, and a microplate reader was used to detect the chemiluminescence value after mixing.

Graphs were made by using Graphpad Prism 7.0 software and the half-inhibitory concentration $IC_{50}$ was calculated.

Figure 9A:
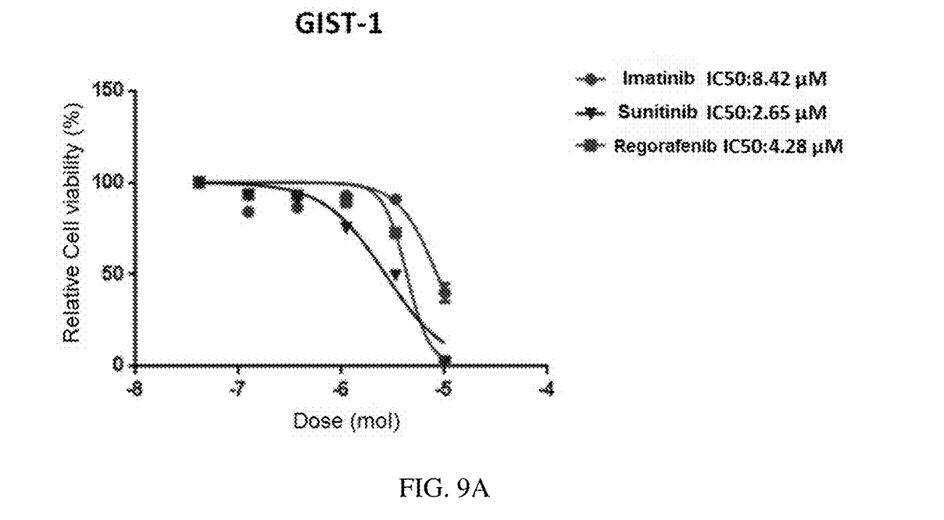
FIGS. 9A and 9B represent the dose-response curves of different targeted drugs on gastrointestinal stromal tumor cells cultured using the culture medium for gastrointestinal stromal tumor cells of the invention.
Figure 9B:
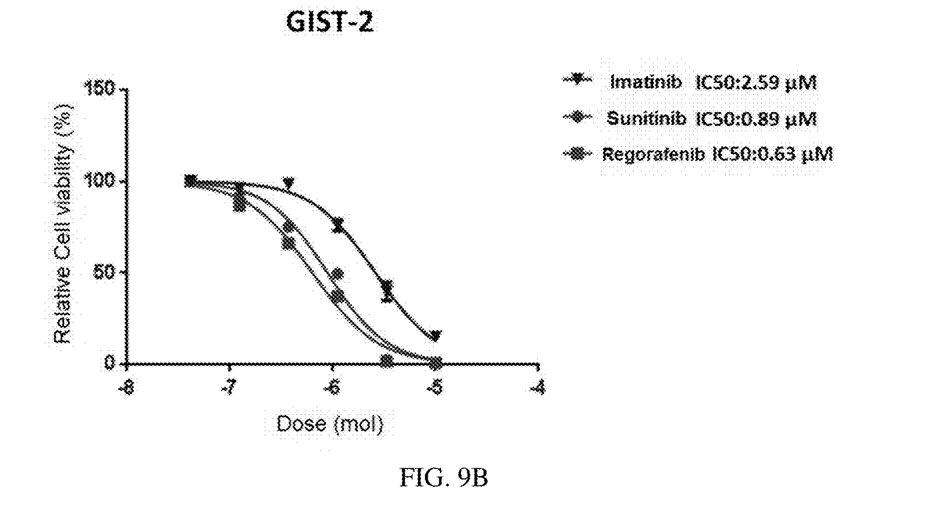

(4) The drug sensitivity testing results are shown in FIG. 9A and FIG. 9B.

FIGS. 9A and 9B respectively show the drug sensitivity of GIST cells cultured from surgical resection cancer tissue samples of two different GIST patients to three targeted drugs, Imatinib, Sunitinib, Regorafenib. The results show that the cells from the same patient have different sensitivities to different drugs, and the cells from different patients also have different sensitivities to the same drug.

Specifically, GIST cells (GIST-1) derived from a CKIT wild-type GIST patient had lower sensitivity to the targeted drug Imatinib targeting CKIT mutant GIST patients, with a half-inhibitory concentration of 8.42 UM; while the sensitivity to the multi-target inhibitor, Sunitinib, was relatively high, with a half-inhibitory concentration of 2.65 μM. The test results of GIST cells (GIST-2) derived from a GIST patient carrying CKIT mutations showed good sensitivity to the targeted drug Imatinib, with a half-inhibitory concentration of 2.59 μM, and better sensitivity to Regorafenib, with a half-inhibitory concentration of 0.63 μM.

According to the results of this example, it can be confirmed that the sensitivity test results of GIST cells cultured using the culture medium for gastrointestinal stromal tumor cells of the invention to targeted drugs are consistent with the clinicopathological typing of the patients. Therefore, the culture medium for gastrointestinal stromal tumor cells of the invention has potential uses in predicting the clinical drug efficacy of GIST patients.

Although the invention has been described in details above with general description and specific embodiments, some modifications or improvements can be made on the basis of the invention, which would be obvious to those skilled in the art. Therefore, these modifications or improvements made without departing from the spirit of the invention should be within the protection scope of the invention.

INDUSTRIAL APPLICABILITY

The invention provides a cell culture medium for culturing primary GIST cells and a culture method for culturing primary GIST cells using the culture medium. The cell culture medium and the culture method of the invention can be used to culture GIST cells with high success rate, convenient operation, free from the interference of non-GIST cells such as fibroblasts, and can be used to construct a primary GIST cell model, obtain GIST cells having the own biological characteristics of GIST patients, and thus, can be used in efficacy evaluating or screening of drugs.

The invention claimed is:

1. A cell culture medium for culturing primary gastrointestinal stromal tumor cells, wherein
the cell culture medium comprises gastrin, N2, insulin, platelet-derived growth factor AA, stem cell factor, basic fibroblast growth factor, and a Rock kinase inhibitor.

2. The cell culture medium of claim 1, wherein
the content of gastrin is 0.3 nM-10 nM.

3. The cell culture medium of claim 1, wherein
the Rock kinase inhibitor is at least one selected from the group consisting of Y27632, fasudil, and H-1152.

4. The cell culture medium of claim 1, wherein
the volume concentration of N2 in the cell culture medium ranges from 1:25 to 1:200;
the content of insulin is 2 μg/ml-20 μg/ml;
each of the content of platelet-derived growth factor AA, stem cell factor, basic fibroblast growth factor is 5 ng/ml-500 ng/ml; and
the content of the Rock kinase inhibitor is 2 μM-50 μM.

5. The cell culture medium of claim 1, wherein
the cell culture medium is free of serum.

6. A culture method for culturing primary gastrointestinal stromal tumor cells, comprising the following steps:
(1) preparing the cell culture medium according to claim 1;
(2) coating a culture vessel with collagen; and
(3) inoculating primary gastrointestinal stromal tumor cells in the coated culture vessel, and culturing the cells under an oxygen concentration of 0.1%-25% by using the cell culture medium.

7. The culture method of claim 6, wherein
the collagen is rat tail collagen type I,
the collagen is diluted with ultrapure water, at a dilution ratio of 1:5-1:100; and
wherein the coating step comprises adding the diluted collagen into the culture vessel to cover the bottom of the vessel completely, and standing for 30 minutes or more.

8. The culture method of claim 6, wherein
in step (3), the culture is performed under an oxygen concentration of 0.1% to 4%.

9. A method for evaluating the efficacy of gastrointestinal stromal tumor drugs or screening of gastrointestinal stromal tumor drugs, comprising the following steps:
(1) culturing gastrointestinal stromal tumor cells by using the culture method according to claim 7;
(2) preparing the drugs to be tested with the required concentration gradients;
(3) adding different concentrations of the drug prepared in step (2) into the gastrointestinal stromal tumor cells cultured in step (1); and
(4) detecting the cell viability.

10. The cell culture medium of claim 2, wherein the content of gastrin is 0.3 nM-3 nM.

11. The cell culture medium of claim 4, wherein the volume concentration of N2 in the cell culture medium ranges from 1:50 to 1:100.

12. The cell culture medium of claim 4, wherein the content of insulin is 5 µg/ml-10 µg/ml.

13. The cell culture medium of claim 4, wherein each of the content of platelet-derived growth factor AA, stem cell factor, and basic fibroblast growth factor is 20 ng/ml-100 ng/ml.

14. The cell culture medium of claim 4, wherein the content of the Rock kinase inhibitor is 5 µM-10 µM.

15. The culture method of claim 7, wherein the collagen is diluted with ultrapure water, at a dilution ratio of 1:10-1:50.

* * * * *